United States Patent [19]
Walton

[11] Patent Number: 6,120,876
[45] Date of Patent: Sep. 19, 2000

[54] GARAGE FLOOR PROTECTOR

[76] Inventor: Wanda J. Walton, 107 Farmers La., Frankfort, Ky. 40601

[21] Appl. No.: 09/216,959

[22] Filed: Dec. 21, 1998

[51] Int. Cl.$^7$ .............................. B32B 3/10; F16N 31/00; B62D 25/20

[52] U.S. Cl. .......................... 428/137; 428/172; 428/188; 296/38; 220/573; 184/106; 180/69.1

[58] Field of Search ............................ 428/81, 156, 137, 428/172, 188, 192; 184/106; 296/38; 220/573; 180/69.1; 442/2

[56] References Cited

U.S. PATENT DOCUMENTS

| | | |
|---|---|---|
| 4,246,982 | 1/1981 | Pretnick . |
| 4,798,754 | 1/1989 | Tomek ...................................... 428/74 |
| 5,266,378 | 11/1993 | Stephenson et al. . |
| 5,308,670 | 5/1994 | Saylor . |
| 5,350,619 | 9/1994 | Rasmussen . |
| 5,478,625 | 12/1995 | Wright ..................................... 428/119 |
| 5,556,692 | 9/1996 | Zheng . |
| 5,626,933 | 5/1997 | Long . |

FOREIGN PATENT DOCUMENTS

| | | |
|---|---|---|
| 477737 | 1/1938 | United Kingdom . |
| 2065469 | 7/1981 | United Kingdom . |

*Primary Examiner*—Donald Loney
*Attorney, Agent, or Firm*—Richard C. Litman

[57] ABSTRACT

A floor protector for a garage floor or the like is formed as a unitary, monolithic sheet for placement in the parking area of a motor vehicle. The protector includes left and right inwardly sloping lateral surfaces, with a longitudinal channel or trough extending down the center of the device. The trough slopes rearwardly, to collect runoff from the lateral slopes and guide the runoff to the rear center of the device where it is removed from the protector and garage by a retractably extendable channel. The remainder of the rearward edge of the protector includes a raised, rounded dam with a central gap for the retractable channel, to preclude runoff from the device at any other point than the location of the central channel. The protector includes flat, level wheel or tire rest points inset in the lateral slopes, for assisting a driver in accurately positioning a vehicle on the device. The protector is preferably sufficiently large to extend at least slightly beyond the dimensions of the vehicle, in order to capture rain, snow, slush, road salt, and other materials which may fall from the vehicle after it is parked, particularly in winter driving conditions. The present floor protector thus serves to protect the underlying floor from moisture and chemical contamination, as well as protecting any articles which might be resting upon the floor and subject to damage from liquid runoff from a vehicle parked on a level floor.

7 Claims, 4 Drawing Sheets

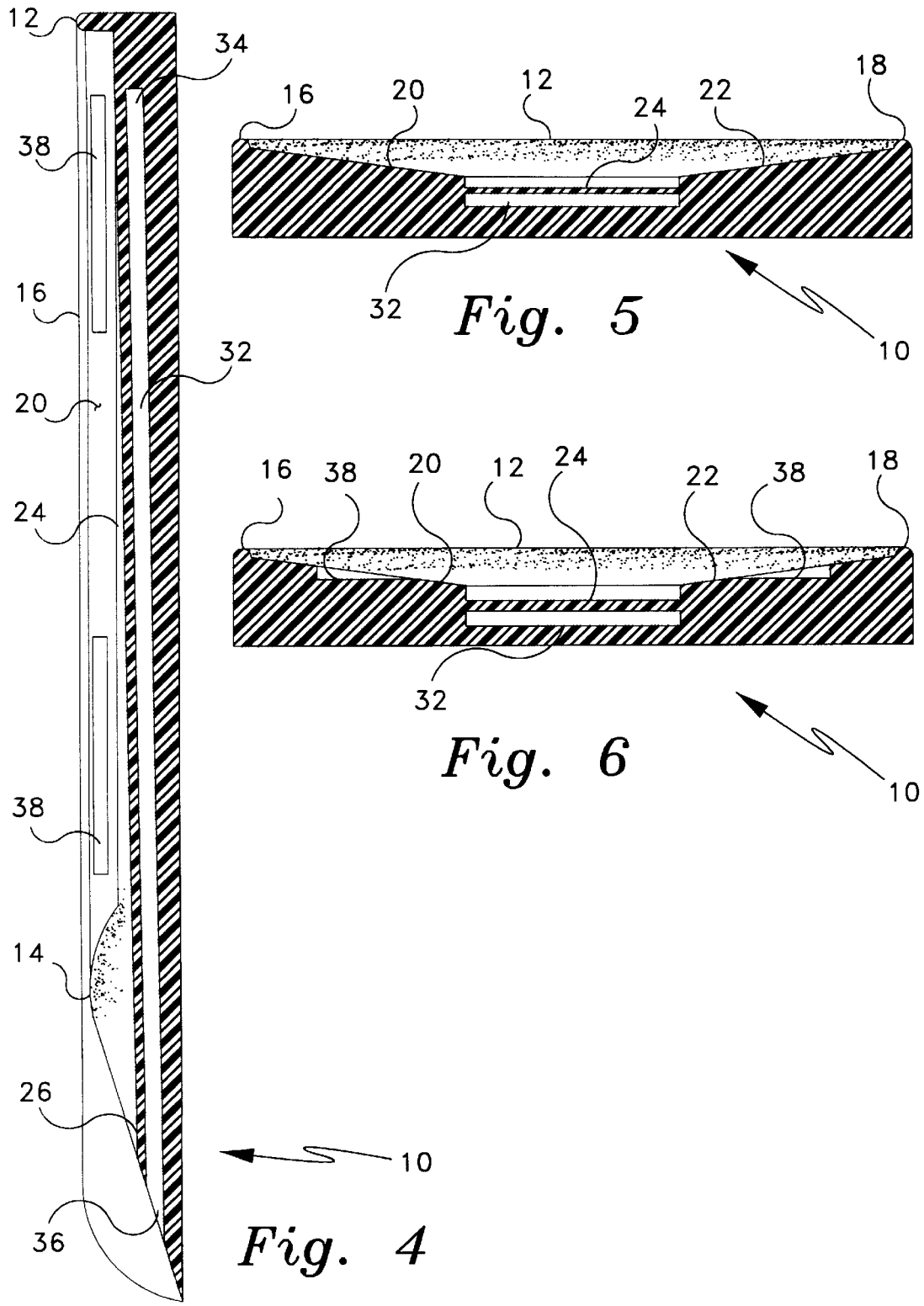

GARAGE FLOOR PROTECTOR

BACKGROUND OF THE INVENTION

1. Field of the Invention

The present invention relates generally to mats and other covering devices for floors and the like, and more specifically to a protective device for capturing water, slush, winter road salt, etc. which drips or falls from a parked vehicle in the winter. The protector is placed on the floor of the garage, and includes multidirectional slopes to cause fluids to drain toward the center rear of the device, whereupon the fluids are drained from the garage by a removable gutter extending from the protector.

2. Description of the Related Art

Road salt, sand and gravel, slush, and snow are routinely encountered in winter driving at least from time to time throughout most of the United States, and in other areas of the world as well. Motor vehicles will routinely pick up several pounds of frozen or slushy debris in such conditions, and carry it beneath the vehicle (under the fenders, etc.) until the vehicle is parked and warms somewhat above freezing, whereupon the material will fall from the vehicle. Even in more temperate driving conditions, rain and heavy dew can cover a motor vehicle with sufficient moisture to cover a large level area, if the vehicle is left in an otherwise dry area.

The result can be an exceedingly sloppy mess, when the vehicle is parked in a household garage or other enclosed parking area. While some garage floors have been provided with a slope for drainage, this is certainly not a universal situation. Generally, such areas have relatively flat floors, and any liquid dripping from the vehicle tends to spread from the vicinity of the vehicle, when little or no slope for runoff is provided. Indeed, sufficient liquid can fall from the vehicle to produce a shallow but relatively large pool of water and other debris, which may spread to contaminate nearby articles resting upon the floor of the garage. This can be quite costly, depending upon the articles stored in the garage and the amount of slush and/or other moisture carried into the garage on the vehicle.

Accordingly, a need will be seen for a floor protector for a garage, for precluding liquid runoff from a vehicle from contacting the garage floor. The device is preferably formed of a hard plastic in order to withstand the weight of a motor vehicle driving over portions thereof. The device preferably has a shallow V-shaped slope descending from each side toward a central longitudinal channel, with the channel sloping downwardly toward the rear of the protector where liquids may drain from the central rear area of the device. A retractable gutter may be extended from the device to channel liquids from the central rear drain of the device. The protector may include four flat and level tire rests formed therein, serving as wheel chocks and positioning means for a vehicle parked thereon.

A discussion of the related art of which the present inventor is aware, and its differences and distinctions from the present invention, is provided below.

U.S. Pat. No. 4,246,982 issued on Jan. 27, 1981 to George Pretnick, titled "Car Ramp And Drip Pan Assembly," describes a ramp having a pair of parallel cleated tire tracks or ramps with a flat central channel therebetween. As the tire ramps extend laterally to the perimeter of the device, it appears that the sides of the vehicle would extend beyond the assembly to drip onto the floor or surface beyond the edge of the Pretnick assembly. Also, Pretnick provides a raised portion of his ramp extending completely across the rearward or entrance end of the device, thus precluding any drainage from that end. Instead, he provides a small drain at the forward end of the ramp assembly. This would not be suitable for use in a garage with no drainage facilities, which is the whole point of having such a device in a garage. Moreover, Pretnick does not provide any slope toward the drain in the assembly, whereas the present floor protector includes slopes for efficient runoff.

U.S. Pat. No. 5,266,378 issued on Nov. 30, 1993 to James Stephenson et al., titled "Wheel Positioning Garage Mat," describes a relatively small mat having a wheel chock formed at each end thereof. The device is only large enough to hold a single vehicle wheel thereon, and only a single one of the Stephenson et al. devices is placed at the parking spot for the vehicle in order for the vehicle to be positioned accurately by feel when parking. No liquid capture is disclosed by Stephenson et al.

U.S. Pat. No. 5,308,670 issued on May 3, 1994 to Steven S. Saylor, titled "Floor Cover With Raised Sides," describes a relatively thin and flexible vinyl sheet having elongate pockets formed along each edge. A section of rubber hose or the like is inserted into each pocket, to provide a raised edge. The sole advantage of the Saylor device appears to be its extremely simple and very inexpensive construction. The simple construction of the Saylor floor cover does not include any slope therein, nor does it include any means for positively positioning a vehicle thereon. Moreover, Saylor fails to provide any drainage means for his floor cover, thus making it extremely difficult to dispose of any runoff collected in the device.

U.S. Pat. No. 5,350,619 issued on Sep. 27, 1994 to Lars B. Rasmussen, titled "Mat For The Collection Of Liquid," describes a mat formed of a plurality of separate sections joined together by fixtures, unlike the unitary, monolithic construction of the present garage floor protector. The Rasmussen mat is raised above the underlying surface but the runoff gutters are permanently imbedded within the surface, thus making the edges of the mat higher than the center, which is opposite the configuration of the present floor protector. The present garage floor protector is portable, and may be installed in a garage without any requirement for modification of the floor for drainage gutters and the like, as is required for the Rasmussen mat. Rasmussen also fails to disclose any specific tire location points and a central drainage location, as are provided in the present garage floor protector.

U.S. Pat. No. 5,556,692 issued on Sep. 17, 1996 to Joe Zheng, titled "Dual Purpose Parking Pad," describes a relatively narrow pad for underlying only one side of the car, i. e., beneath the two wheels, fenders, and rocker panel of either the left or the right side of the vehicle. Zheng requires two of his devices for both sides of the car, and still leaves open the area beneath the central portion of the vehicle. Zheng states that the central portion of the vehicle will not deposit any fluids upon the underlying surface if the vehicle is in good condition, but this is not necessarily true. Spilled oil and fluids may still flow down the outer surface of the engine to the underlying surface during maintenance, and snow, slush, and ice are generally deposited beneath the entire vehicle in winter conditions. The present invention responds to this problem by protecting the entire floor area beneath and extending outwardly from the sides of the vehicle to some extent, unlike the Zheng device. Moreover, the only sloped portion of the Zheng mat is at the entrance lip, with the remainder of the device being flat and level and inhibiting runoff.

U.S. Pat. No. 5,626,933 issued on May 6, 1997 to Marcel Long, titled "Modular Floor Cover," describes a relatively thin, flat, ribbed mat material which is assembled from a plurality of sections by cooperating connector components which engage the ribs of the mat material. The above described construction does not provide for any form of slope of the surface of the assembly, to assist drainage. Moreover, no tire rest points are provided by the Long mat, for positively locating a vehicle thereon.

British Patent Publication No. 477,737 to Archibald L. Trigg and accepted on Jan. 5, 1938, titled "A Bath Mat," describes a mat constructed of numerous slats disposed in two layers, with each layer normal to the other. Gaps are provided between the slats, for drainage into an underlying tray. The multiple piece construction is unlike the unitary, monolithic form of the present garage floor protector, and no slope is provided by Trigg for his bath mat. As the Trigg device is intended as a bath mat, he does not provide any form of positive wheel or tire location means, as provided with the present garage floor protector. Such a bath mat would be unsuitable for use beneath a motor vehicle in any case, as the multiple slat construction would be crushed or at least deformed by the weight of the vehicle, and the device is entirely too small to protect the entire floor area beneath a vehicle.

Finally, British Patent Publication No. 2,065,469 published on Jul. 1, 1981 to Hiroyuki Tarui, titled "Shoe Scraper Mat," describes a mat with a rubber base and continuous perimeter walls, into which one or more scraper materials are inset. One embodiment includes two separate scraper portions. Tarui does not provide any form of tire rest or location means, as he does not intend his mat to be used beneath a motor vehicle. While Tarui does provide a raised edge, he does not provide any drain openings therefrom nor any slope to guide runoff to a specific area of the mat, as provided in the present garage floor protector.

None of the above inventions and patents, either singly or in combination, is seen to describe the instant invention as claimed.

SUMMARY OF THE INVENTION

The present invention comprises a floor protector for a garage or other floor where vehicles are parked from time to time. The present protector serves to protect the underlying floor from snow, slush, road salt, etc. which is typically gathered by vehicles in winter driving conditions, and deposited when the vehicle is parked in above freezing conditions. The present protector is formed of a unitary, monolithic molded or cast structure, preferably of a hard, durable plastic for corrosion resistance. Other materials (hard rubber having a high durometer, etc.) may be used, if desired. The protector is formed with a raised lip or perimeter on three sides thereof, with the floor sloping laterally inwardly from its highest point at each side or edge. A central trough or channel slopes rearwardly from a point level with the low point of the lateral slope at the front of the protector, and is inset beneath the level of the lateral slope toward the rear of the protector. Thus, snow, slush, etc. falling from a vehicle parked on the present floor protector will run inwardly to the central channel or trough, and thence rearwardly to the exit of the device.

Each inwardly sloping side includes a flat, level tire rest area, serving as a guide for the tires of the vehicle tires when parking the vehicle upon the protector. The rearward edge includes a raised, rounded ridge having a central gap, to preclude runoff from exiting the protector at a point other than at the central gap. A retractable gutter may be extended at the central rearward drainage gap to collect runoff and remove it from the garage.

Accordingly, it is a principal object of the invention to provide an improved garage floor protector comprising a semi-rigid, unitary, monolithic structure for placing in the parking area of a motor vehicle, for protecting the underlying floor or other surface from snow, slush, and/or other fluid runoff from the vehicle while parked.

It is another object of the invention to provide an improved floor protector incorporating inwardly sloping sides each of which terminate at low edges adjacent the longitudinal center of the device, with a central longitudinal channel sloping rearwardly down the center of the device to guide and channel all liquid runoff to the central rear area of the protector.

It is a further object of the invention to provide an improved floor protector including a raised rounded area along the rear portion thereof for precluding runoff rearwardly therepast, with the raised rounded area having a central gap for channeling runoff therethrough.

An additional object of the invention is to provide an improved floor protector including a retractable channel which may be extended from the rear central gap of the protector, for channeling runoff away from the protector and floor area.

Still another object of the invention is to provide an improved floor protector including level wheel or tire rest areas formed in the lateral slopes, for providing guidance for positioning the motor vehicle on the protector.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

FIG. 4 is an elevation view in section along line 4—4 of FIG. 3, showing the slope of the central trough of the protector and the central slot for storage of the retractable gutter.

FIG. 5 is an elevation view in section along line 5—5 of FIG. 3, showing the left and right lateral slope toward the center of the protector and gutter slot.

FIG. 6 is an elevation view in section along line 6—6 of FIG. 3, showing the level tire position areas inset in the left and right lateral slope, as well as the gutter slot.

Similar reference characters denote corresponding features consistently throughout the attached drawings.

DETAILED DESCRIPTION OF THE PREFERRED EMBODIMENT

The present invention comprises a floor protector providing protection from liquid spills and the like, when the protector is placed over a floor area. The present protector is particularly well adapted for use in a household garage or the like, for parking a motor vehicle thereon and capturing snow, slush, road salt, and/or chemical runoff from the vehicle, particularly when the vehicle is parked after use in winter driving conditions. It will be seen that the present floor protector is of value in other environments where motor vehicles are commonly parked, such as automobile showrooms, wash racks, etc.

Figure 1:
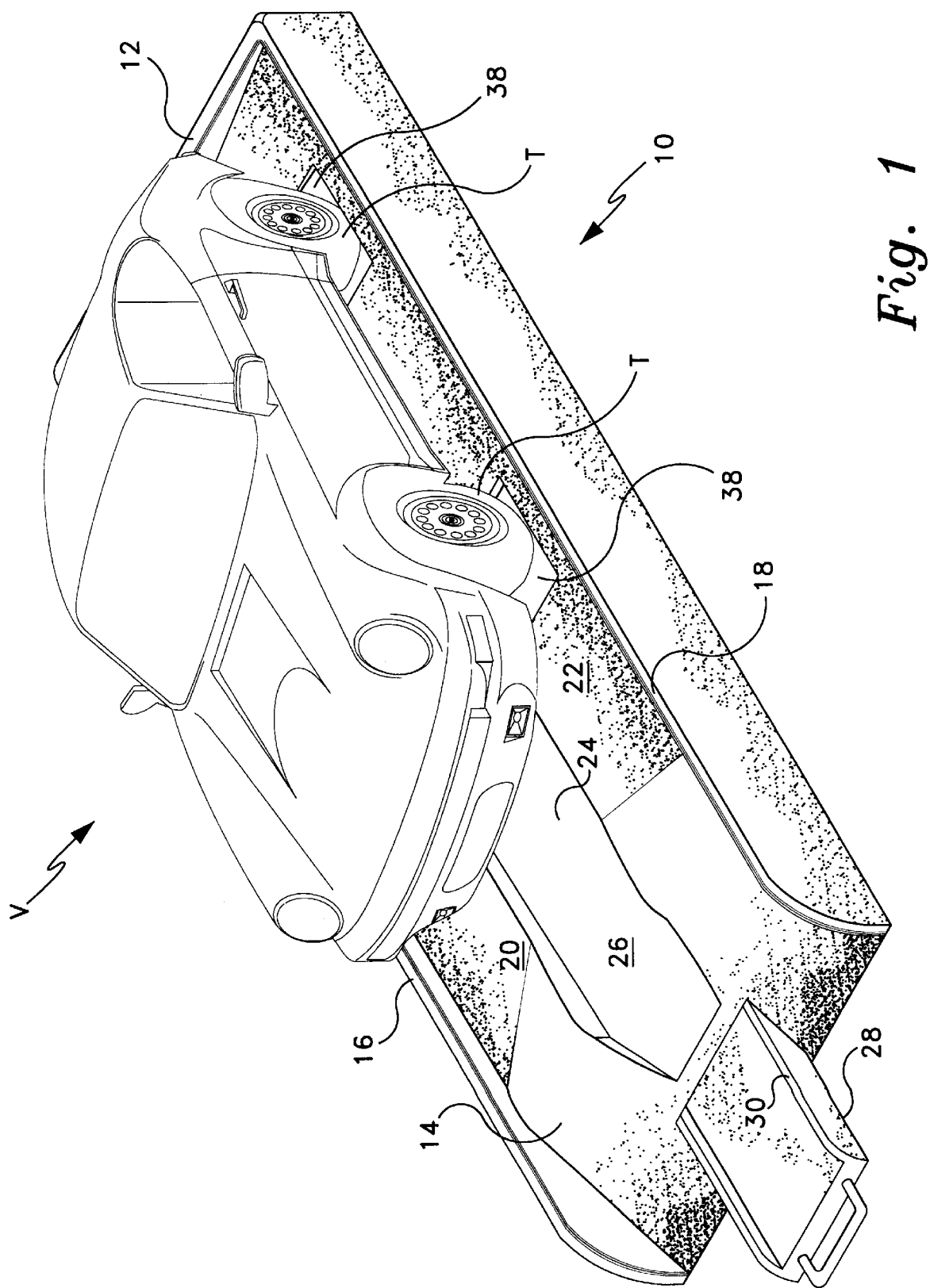
FIG. 1 is an environmental perspective view of a vehicle parked upon the present floor protector, showing the general configuration of the protector and runoff flow from the vehicle.
Figure 2:
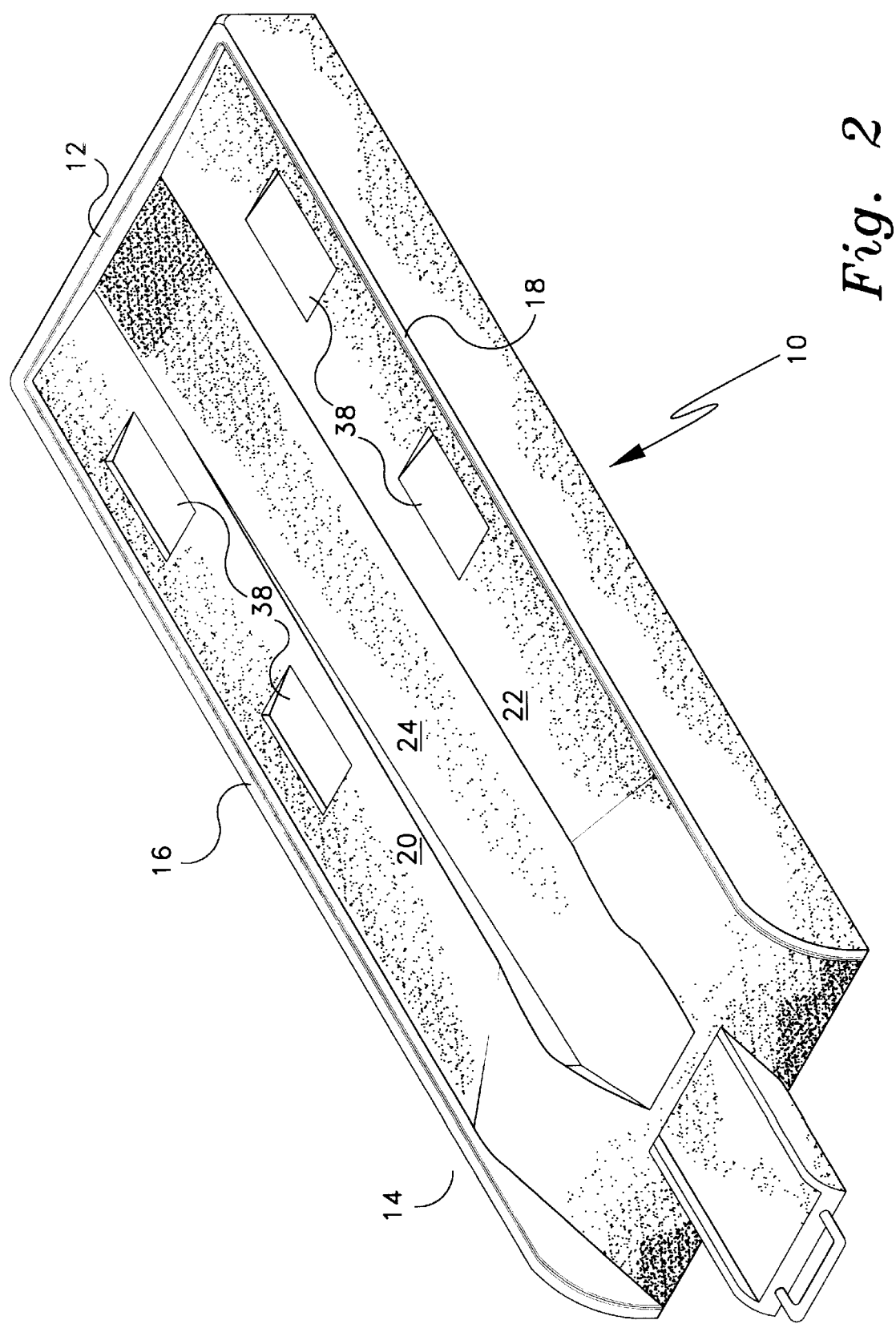
FIG. 2 is a perspective view of the floor protector with the vehicle removed to show further detail.

FIGS. 1 and 2 provide perspective views of the present floor protector, indicated by the reference numeral 10 throughout the drawing figures, in use with a vehicle V parked thereon (FIG. 1) and without the vehicle (FIG. 2). The protector 10 may be formed as a single, unitary, monolithic sheet of hard plastic or other suitable material (hard rubberized material, etc.) as desired. Preferably, the protector 10 is formed of a material which is impervious to the corrosive effects of road salts, strong chemicals, etc., which may be associated with a motor vehicle and its operation. The protector sheet 10 preferably extends at least slightly beyond the longitudinal and lateral dimensions of a conventional motor vehicle V, as shown by the broken line outline of a typical motor vehicle V in the top plan view of the present floor protector 10 in FIG. 3, in order to capture all runoff which falls from any point of the vehicle V which is parked thereon.

The floor protector sheet 10 has a generally rectangular shape, in keeping with the generally rectangular planforms of most motor vehicles V which will be parked thereon. The protector 10 is sloped downwardly from its peripheral edges toward its rearward center, as will be explained in greater detail further below. Thus, the protector 10 has a raised forward edge or lip 12, opposite raised rearward edge or area 14, and opposite raised first and second lateral edges or lips, respectively 16 and 18. These raised edges, lips, or areas 12 through 18 serve to capture any liquid runoff from an automobile or the like, within the edges 12 through 18 and channel or guide the runoff to the rearward central area of the protector sheet 10, as described further below.

The upper surface of the protector 10, between the peripheral edges or areas 12 through 14, preferably includes three separate sloped areas. The first and second slopes, respectively 20 and 22, slope laterally downwardly and inwardly toward the center respectively from the first and second lateral edges 16 and 18, as is shown clearly in FIG. 2 and in the sectional elevation views of FIGS. 5 and 6. A third slope comprising a longitudinal channel 24 is formed centrally down the length of the protector 10, between the lowest edges of the first and second lateral slopes 20 and 22. The forward end of the channel 24 is essentially level or even with the lower edges of each of the lateral slopes 20 and 22, but slopes downwardly over essentially the entire length of the protector 10 to a central gap defining a runoff drain 26 formed through the raised rearward area 14 of the protector device 10.

Accordingly, when a vehicle V (which could be a motor vehicle, trailer, etc.) is parked over the present floor protector 10, any snow, slush, road salt or other chemicals or substances, etc. which fall from the underside of the vehicle V, will fall onto either one of the two lateral slopes 20 and 22, and/or into the central drainage channel 24. The two lateral slopes 20 and 22 will guide such runoff into the central channel 24, which in turn slopes toward the central rear runoff drain 26 to channel the runoff from beneath the vehicle V and from the floor protector 10, thus precluding any spillage or contact of such runoff materials onto the underlying floor or other surface.

Liquid runoff spilling from the rear runoff drain 26, will spill onto the garage floor at the rear of the garage unless some means of conducting the runoff from the drain 26 is provided. Accordingly, a retractably extendable drainage channel or gutter 28 is provided, which may be extended rearwardly beyond the central runoff passage 26 at the rear of the protector 10. The retractable drainage channel 28 includes opposite lateral raised edges 30, to preclude lateral spillage of liquid from the channel 28.

The floor protector 10 includes an integral channel or gutter storage slot 32, shown in the various cross sectional views of FIGS. 4, 5, and 6. The slot 32 slopes downwardly from a raised forwardmost position 34 to a lowermost rearward position 36 essentially conterminous with the rearward edge of the protector, as shown in FIG. 4, in order to provide good drainage for the retractable channel or gutter 28 when it is stored within the slot.

As noted, the present floor protector 10 is particularly well suited for protecting the floor of a garage or other motor vehicle storage area from various frozen liquid substances which may be deposited on the vehicle during winter driving conditions. As the present protector 10 is intended to have a vehicle parked thereon at least some of the time, the protector 10 provides further means for enhancing such vehicle parking. A plurality (e. g., four) tire rest areas 38 are provided in the two sloped surfaces 20 and 22, enabling the driver of the vehicle to tell when the vehicle is essentially centered upon the protector 10. A forward and a rearward tire rest area 38 is formed in each lateral slope 20 and 22, corresponding to the forward and rearward tires T of the vehicle V. Each tire rest area 38 is a flat and level surface, coplanar with the other rest areas 38, and inset into a respective lateral slope 20 or 22.

Obviously, the present protector 10 may be formed in a variety of different sizes as desired corresponding to the overall dimensions, wheelbase, and track of various vehicles. However, the tire rest areas 38 may have sufficiently large areas to allow a fair amount of latitude for different vehicles using the same protector 10, in order to reduce the number of different sizes of floor protectors 10 which might be required for all vehicles. Similarly, it will be seen that more than four such tire rest areas may be provided, for larger vehicles having more than a single front and rear axle assembly.

It will also be noted that the raised rear area 14 of the protector 10 differs from the other three raised edges 12, 16, and 18, in that it is formed as a relatively wide and rounded hump having a small radius (somewhat resembling a "speed bump," but not formed for the same purpose) with a gradual entry slope to allow the relatively smooth passage of the tires of a vehicle thereover. Thus, when a vehicle V is to be parked atop the present floor protector 10, the driver of the vehicle V need only position the vehicle V with tires of one side aligned generally with the left side tire rest areas 38, with the opposite side tires T thereby being automatically aligned generally with the right side tire rest areas 38. The vehicle V is then driven onto the floor protector 10, with the leading tires of the vehicle passing smoothly over the raised hump of the rearward liquid barrier 14 and onto the rearward portions of the two lateral slopes 20 and 22.

The leading tires of the vehicle will first encounter the two flat and level rear tire rest areas 38, which the driver is able to detect due to the raised edges of the sloped areas 20, 24 relative to the inset level tire rest areas 38. The driver continues to guide the vehicle onto the floor protector 10 with the trailing tires passing over the raised rear hump area 14, and with the leading tires coming to rest in the front tire rest areas 38 and the trailing tires correspondingly coming to rest in the rear tire rest areas 38. (The leading and trailing tires may be either the front or rear tires of the vehicle, depending upon whether the vehicle is driven forwardly or backed onto the floor protector.)

Figure 3:
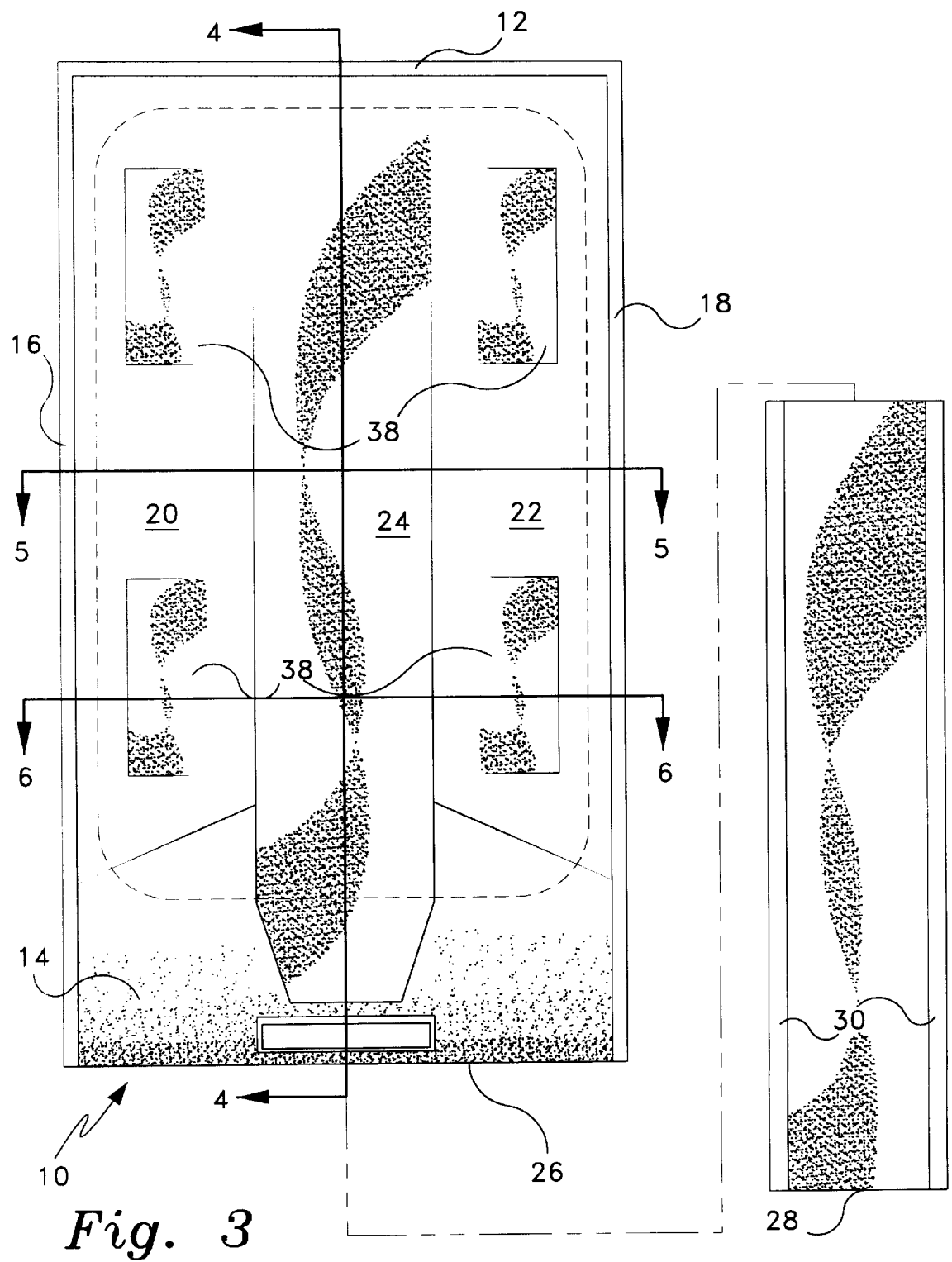
FIG. 3 is a top plan view of the present protector and retractable runoff channel therefor.

As the tire rest areas 38 are inset somewhat from the four edges 12 through 18, the lateral limits of the vehicle V remain over the area of the protector 10 with the edges 12 through 18 extending beyond the horizontal dimensions of the vehicle V, as shown in FIG. 3. Thus, melting snow, slush, dissolved road salt, or rainwater, etc. which has collected on the vehicle during a drive, will fall onto the underlying protector 10, where it runs down the lateral slopes 20 and 22 to the central channel 24, and is thence drained from the protector 10 by the rearward drain passage 26 formed through the rounded hump area 14. Further displacement of the liquid runoff from the protector is provided by installing the removable gutter or channel 28 as described further above.

In summary, the present floor protector provides a most desirable means of keeping a garage floor or the like clear from liquid runoff of any sort from a vehicle parked thereon. The floor protector will pay for itself in many instances by protecting valuable goods which may be stored in the garage, from water damage due to runoff spreading from a parked vehicle. The removable channel which may be used with the present floor protector, further assists in removing runoff from the protector and garage interior. The present floor protector will prove to be a most valuable accessory which will save a considerable amount of cleanup time and effort, and preserve valuable goods stored in the garage.

It is to be understood that the present invention is not limited to the sole embodiment described above, but encompasses any and all embodiments within the scope of the following claims.

I claim:

1. A garage floor protector, comprising:

a sheet of material for parking a vehicle thereon and for collecting liquid runoff therefrom;

said sheet having a raised forward edge and an opposite raised rearward edge, a raised first lateral edge and an opposite raised second lateral edge, for capturing liquid therebetween;

said raised rearward edge includes a rounded hump for allowing the passage of vehicle tires thereover, said hump having a central passage therethrough;

a longitudinal storage slot formed within said sheet of material; and a channel retractable extendable from said storage slot, with said channel communicating with said central passage through said hump when said channel is extended from said sheet, for channeling liquids away from said sheet;

said sheet including an upper surface having at least one downward slope extending from said raised forward edge to said central passage.

2. The floor protector according to claim 1, wherein said sheet is formed as a single, unitary, monolithic component.

3. The floor protector according to claim 1 with the vehicle parked thereon having longitudinal and lateral dimensions, wherein said sheet extends generally horizontally beyond the longitudinal and lateral dimensions of the vehicle.

4. The floor protector according to claim 1, wherein:

said downward slope of said upper surface comprises a first slope from said first lateral edge and an opposite second slope from said second lateral edge;

said first and said second slope including a channel therebetween; and said channel having a downward slope from said forward edge to said rearward edge.

5. The floor protector according to claim 4, wherein said first slope and said second slope each include at least two level vehicle tire rests inset therein.

6. The floor protector according to claim 1, wherein said storage slot slopes downwardly from a forwardmost end to a rearwardmost end, with said rearwardmost end terminating at said rearward edge of said sheet of material.

7. The floor protector according to claim 1, wherein said sheet is formed of a hard plastic material.

* * * * *